United States Patent [19]
Weiser et al.

[11] Patent Number: 6,084,000
[45] Date of Patent: Jul. 4, 2000

[54] HOLLOW POLYIMIDE MICROSPHERES

[75] Inventors: Erik S. Weiser, Newport News; Terry L. St. Clair, Poquoson, both of Va.; Yoshiaki Echigo; Hisayasu Kaneshiro, both of Kyoto, Japan

[73] Assignee: The United States of America as represented by the Administrator of the National Aeronautics and Space Administration, Washington, D.C.

[21] Appl. No.: 09/394,534

[22] Filed: Sep. 10, 1999

Related U.S. Application Data

[62] Division of application No. 09/316,865, May 21, 1999.

[51] Int. Cl.$^7$ .......................................... C08J 9/36

[52] U.S. Cl. ............................. 521/54; 521/183; 521/184; 521/189; 521/134

[58] Field of Search ............................. 521/54, 183, 184, 521/189, 134

[56] References Cited

U.S. PATENT DOCUMENTS

| | | | |
|---|---|---|---|
| 4,407,980 | 10/1983 | Gagliani et al. | 521/183 |
| 4,425,441 | 1/1984 | Gagliani et al. | 521/56 |
| 4,433,068 | 2/1984 | Gagliani et al. | 521/54 |
| 4,946,737 | 8/1990 | Lindeman | 521/54 |
| 4,956,393 | 9/1990 | Boyd et al. | 521/54 |
| 5,120,769 | 6/1992 | Dyksterhouse et al. | 521/54 |
| 5,234,752 | 8/1993 | Wong | 521/54 |
| 5,356,958 | 10/1994 | Matthews | 521/55 |

*Primary Examiner*—Morton Foelak
*Attorney, Agent, or Firm*—Hillary W. Hawkins

[57] ABSTRACT

A shaped article composed of an aromatic polyimide has a hollow, essentially spherical structure and a particle size of about 100 to about 1500 μm, a density of about 1 to about 6 pounds/ft$^3$ and a volume change of 1 to about 20% by a pressure treatment of 30 psi for 10 minutes at room temperature. A syntactic foam, made of a multiplicity of the shaped articles which are bonded together by a matrix resin to form an integral composite structure, has a density of about 3 to about 30 pounds/ft$^3$ and a compression strength of about 100 to about 1400 pounds/in$^2$.

5 Claims, 2 Drawing Sheets

6,084,000

HOLLOW POLYIMIDE MICROSPHERES

CROSS-REFERENCE TO RELATED APPLICATIONS

This application is a divisional application of commonly owned patent application Ser. No. 09/316,865, filed May 21, 1999.

ORIGIN OF THE INVENTION

The invention described herein was jointly made by employees of the United States Government and employees of Unitka Ltd. In the performance of work under NASA MOA, SAA #385.

BACKGROUND OF THE INVENTION

1. Field of the Invention

The present invention relates generally to polyimides. It relates in particular to shaped articles composed of aromatic polyimides, especially hollow microspheres.

2. Description of the Related Art

High performance polyimides are presently employed in a number of applications, for example in joining metals to metals, and in joining metals to composite structures in the aerospace industry. In addition, polyimides are rapidly finding new uses as foam insulation in cryogenic applications and as structural foam, having increased structural stiffness without large weight increases. Foams of various densities and thermal and mechanical properties are now being required for future reusable launch vehicles, maritime ships, and aircraft. Polyimide foam materials have a number of beneficial attributes in these applications, such as high temperature and solvent resistance, flame resistance, low smoke generation high modulus and chemical and hot water resistance.

U.S. Pat. Nos. 5,147,966 and 5,478,916 disclose polyimides that can be melt processed into various useful forms such as coatings, adhesives, composite matrix resins and films. These polyimides are prepared from various diamines and dianhydrides in various solvents. The use of monoanhydrides as endcapping agents is also disclosed in these patents to control the molecular weight of the polymers and, in turn to make them easier to process in molten form. The use of ethers to make polyimide adhesives was disclosed in U.S. Pat. No. 4,065,345, which demonstrates another method to produce polyimide resin systems. FIG. 1 shows the method employed by these patents to produce polyimides.

U.S. Pat. No. 3,483,144 discloses a process for making polyimide foam by ball milling a mixture of monomers and heating the mixture to 300° C. In all cases, the foams produced by this patent are the result of dianhydrides or tetraacids being dissolved by a diamine upon melting. The ensuing reaction produces water and thus foams the molten material. FIG. 2 illustrates the process to make foam by this patent.

The state-of-the-art technology for making polyimide foams as disclosed in U.S. Pat. Nos. 5,298,531, 5,122,546, 5,077,318, and 4,900,761 utilizes solutions of diamines and dianhydride derivatives in a low molecular weight alkyl alcohol solvent. Polyimide precursor solutions and powders therefrom are then processed into foams through the expulsion of water and alcohol (R—OH) during the thermal imidization process. In these cases the alcohol solvent reacts initially with the dianhydride to form a covalently bonded specie referred to as a dialkylester-diacid (DADA) before the aromatic diamine is added. The aforementioned patents also illustrate the use of blowing agents to aid in the foaming process. The blowing agents utilized by these patents serve as a separate entity and usually result in a foam that has residual blowing agent within its cell walls. FIG. 3 demonstrates the state-of-the-art in this foam preparation technology.

Howsoever useful, these related art foam products and processes do not provide for all that is required in present and future applications. In particular, they do not provide for efficient and efficacious repair of foam insulation already in place, for example on aircraft, spacecraft and maritime ships. Moreover, they do not readily and effectively afford the preparation of syntactic foam structures, the demand for which continues to increase because of their beneficial attributes.

U.S. Pat. Nos. 4,407,980; 4,425,441; and 4,433,068 disclose the preparation of macro balloons made from a mixture of polyimide and polyimide-amide polymers, the particle size thereof being at least 0.5–10 mm. Because these structures are not pure polyimide products, they are found wanting in respect of thermal stability and non-flammability. Because these structures are microspheres, they lack the wide range of utility that would be afforded by microspheres.

SUMMARY OF THE INVENTION

It is accordingly a primary object of the present invention to provide what is lacking in the related art, viz., a foam-like product which can provide for efficient and efficacious repair of foam insulation already in place, for example on aircraft, spacecraft and maritime ships, and which readily and effectively affords the preparation of syntactic foam structures. It is a related object of the present invention to provide a polyimide foam-like product which has all of the attributes characteristic of polyimides, and which in addition can supply what has been found wanting in the related art. It is another related object of the present invention to provide a syntactic foam structure which has properties and characteristics which meet present and future demands.

These objects and their attending benefits are achieved and the disadvantages of the related art are avoided, by the present invention. In one aspect thereof, the present invention is a multiplicity of hollow polyimide microspheres i.e., shaped articles, each of which has an aromatic polyimide shell, a hollow interior, and an essentially spherical structure with a particle size between about 100 and about 1500 $\mu$m.

In another aspect thereof, the present invention is a syntactic foam, which is made up of a multiplicity of shaped articles according to the present invention, which are bonded together by a matrix resin to form an integral, composite structure having a density according to ASTM D-3574A of between about 3 and about 30 pounds/ft$^3$ and a compression strength according to ASTM D-3574C of between about 100 and about 1400 pounds/in$^2$.

BRIEF DESCRIPTION OF THE DRAWINGS

For a more complete understanding of the present invention, including its primary and related objects and benefits, reference should be made to the Description of the Preferred Embodiments, which is set forth below. This Description should be read together with the accompanying Drawings, wherein.

DESCRIPTION OF THE PREFERRED EMBODIMENTS

Figure 1:
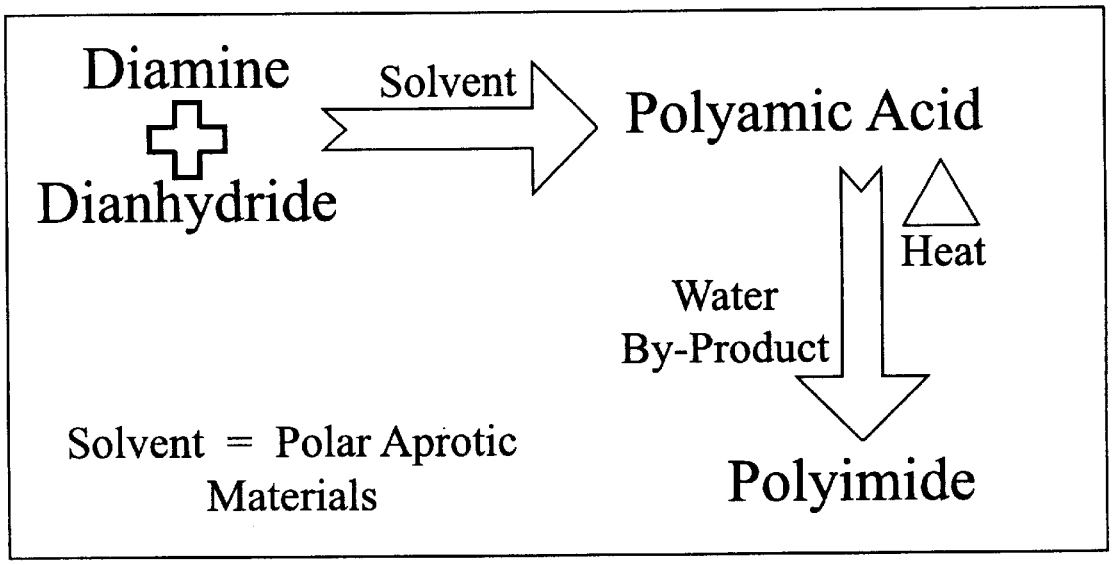
FIG. 1 is a process schematic representing a standard process for preparing polyimides.
Figure 2:
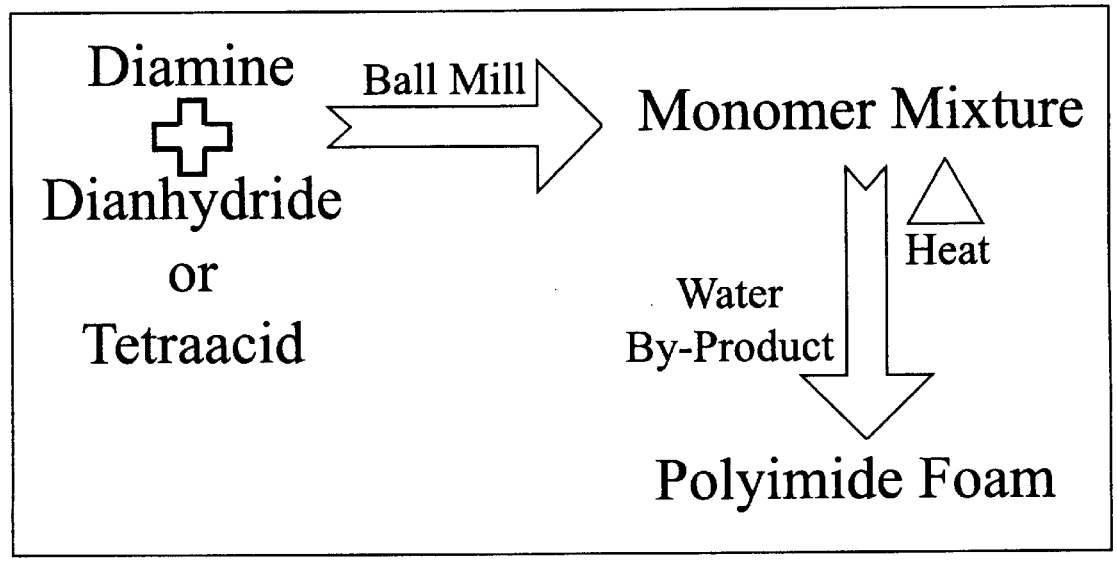
FIG. 2 is a process schematic representing a related art preparation of polyimide foam by ball milling.
Figure 3:
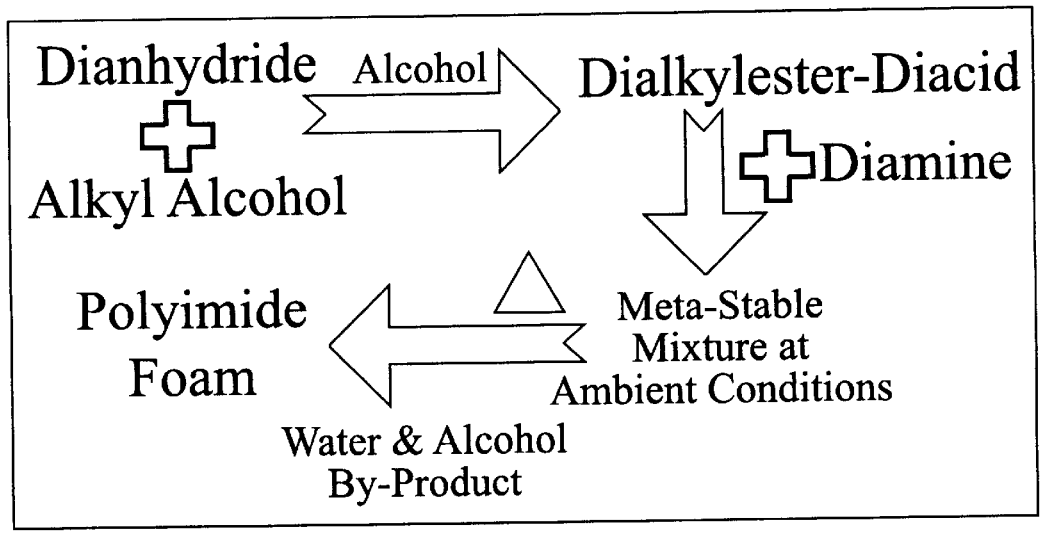
FIG. 3 is a process schematic representing a state-of-the-art process for preparing polyimide foam.
Figure 4:
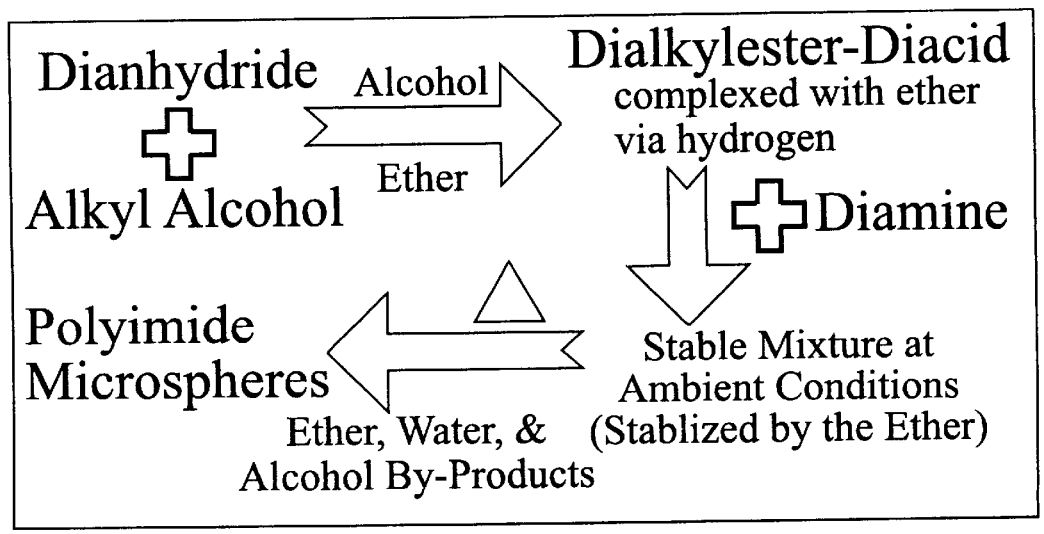
FIG. 4 is a process schematic representing a process for the preparation of hollow polyimide microspheres according to the present invention.

Shaped articles according to the present invention are composed of an aromatic polyimide and have a density according to ASTM D-3574A of between about 1 and about 6 pounds/ft$^3$, and they exhibit a volume change between about 0% and about 20% by a pressure treatment of 30 psi for 10 minutes at room temperature. Shaped articles according to the present invention also have a thermal stability of from 0 to about 1% weight loss at 204° C. as determined by thermogravimetric analysis (TGA).

The aromatic polyimide which advantageously composes the shaped articles according to the present invention has repeating units represented by formula (I):

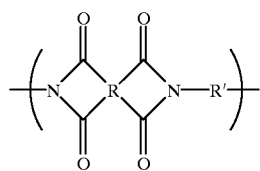

(I)

wherein R is a tetravalent aromatic radical having 1 to 5 benzenoid-unsaturated rings of 6 carbon atoms, the four carbonyl groups being directly bonded to different carbon atoms in a benzene ring of the R radical, each pair of carbonyl groups being bonded to adjacent carbon atoms in the benzene ring of the R radical; and R' is a divalent aromatic radical having 1 to 5 benzenoid-unsaturated rings of 6 carbon atoms, the amino groups being directly bonded to different carbon atoms in a benzene ring of the R' radical.

As used herein, the following abbreviations are understood to mean:

ODPA=4,4'-oxydiphthalic anhydride
ODP—TA=4,4'-oxydiphthalic acid (a tetraacid)
BPDA=3,3',4,4'-biplhenyl tetracarboxylic dianhydride
BTDA=3,3'4,4'-benzophenone tetracarboxylic dianhydride
DSDA=3,3'4,4'-diphenylsulfone tetracarboxylic dianhydride
PMDA=pyromellitic dianhydride
BPADA=2,2-bis(4-(3,4-carboxyphenyl))propane dianhydride
3,4'ODA=3,4'-oxydianiline
4,4'ODA=4,4'-oxydianiline
APB=1,3-bis(3-aminophenoxy)benzene
BPB=1,3-bis(4-aminophenoxy)benzene
m-PDA=m-phenylenediamine
p-PDA=p-phenylenediamine
3,3'DDS=3,3'-diaminodiphenylsulfone
4,4'DDS=4,4'-diaminodiphenylsulfone
4,4 BAPS=bis(4-(4-aminophenoxy)phenyl)sulfone
4,3 BAPS=bis(4-(3-aminophenoxy)phenyl)sulfone
3 BAPB=4,4'-bis(3-aminophenoxy)biphenyl
4 BAPB=4,4'-bis(4-aminophenoxy)biphenyl
BAPP=2,2'-bis (4-(4-aminophenoxy)phenyl)propane Shaped articles according to the present invention are composed of any aromatic polyimide, and preferably an aromatic polyimide having repeating units represented by formula (I) above. Shaped articles according to the present invention have been found to be especially beneficial if the aromatic polyimide of which they are composed is prepared by reacting at least one derivative of a dianhydride selected from the group consisting of ODPA; BPDA; BTDA; DSDA; PMDA and BPADA with at least one derivative of a diamine selected from the group consisting of 3,4'ODA; 4,4'ODA; APB; BPB; m-PDA; p-PDA, 3,3'DDS; 4,4'DDS; 4,4BAPS; 4,3BAPS; 3BAPB; 4BAPB and BAPP. Equally beneficial results are obtained if the aromatic polyimide is an admixture of two or more different polyimides prepared by reacting at least one derivative of a dianhydride selected from the group consisting of ODPA; BPDA, BTDA; DSDA; PMDA and BPADA with at least one derivative of a diamine selected from the group consisting of 3,4'ODA; 4,4'ODA; APB; BPB; m-PDA; p-PDA; 3,3'DDS; 4,4'DDS; 4,4BAPS; 4,3BAPS; 3BAPB; 4 BAPB and BAPP. Also beneficial are shaped articles derived from copolyimide synthesized from the aromatic dianhydride derivatives and aromatic diamine derivatives listed above.

The combination of particle size, density and resistance to pressure, along with the chemical and thermal properties of aromatic polyimides, provides shaped articles according to the present invention with the potential for use in many applications in the aeronautics, aerospace, and maritime industries.

Shaped articles according to the present invention are advantageously prepared by the following process:

(1) providing an aromatic polyimide precursor solid residuum, which is an admixture of an aromatic compound (A), which is an aromatic dianhydride or a derivative of an aromatic dianhydride, and an aromatic compound (B), which is an aromatic diamine or a derivative of an aromatic diamine, plus a complexing agent (C), which is complexed with the admixture by hydrogen bonding, the complexing agent (C) being present in an amount sufficient to provide from about 1 to about 15% by weight, based on the total weight of the polyimide precursor solid residuum. Especially beneficial results are obtained if the aromatic polyimide precursor solid residuum is prepared from an admixture of an aromatic compound (A)

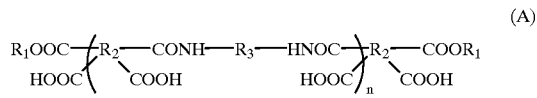

(A)

and an aromatic compound (B)

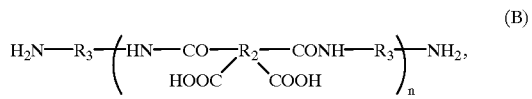

(B)

wherein n is an integer from 0 to 3, and $R_1$ is hydrogen or an alkyl group, and $R_2$ is a tetravalent aromatic radical having 1 to 5 benzenoid-unsaturated rings of 6 carbon atoms, $R_3$ is a divalent aromatic radical having 1 to 5 benzenoid-unsaturated rings of 6 carbon atoms;

plus a complexing agent (C) which is complexed with the admixture by hydrogen bonding and which has a boiling temperature of less than 200° C., the complexing agent (C) being present in an amount sufficient to provide from about 1 to about 15% by weight, based on the total weight of the aromatic polyimide precursor solid residuum which is formed by heating the complexed admixture to remove any excess complexing agent and volatile by-products. Outstanding results are obtained if the aromatic compound (A) and the aromatic compound (B) as specified above are present in the admixture in approximately equimolar amounts;

(2) charging the aromatic polyimide precursor solid residuum into a non-confined vessel;

(3) heating the aromatic polyimide precursor solid residuum in the non-confined vessel to a temperature between about 100° C. and 200° C. to produce a multiplicity of shaped articles from the aromatic polyimide precursor solid residuum in the non-confined vessel;

(4) heating the multiplicity of shaped articles to a temperature between about 200° C. and 300° C. to produce a multiplicity of thermally imidized shaped articles; and (5) cooling the multiplicity of thermally imidized shaped articles for subsequent utilization.

Although not required in the practice of this process, conventional additives may be added to the above described solution or to the resulting polyimide precursor solid residuum if desired. Examples of such additives are surface active agents (SH190,8H193-Toray/Dow Corning silicone; Zonyl FSC-DuPont; L550, L5430-Union Carbide), pigments, fibrous fillers, and the like.

In another aspect thereof, the present invention is a syntactic foam, which is made up of a multiplicity of shaped articles according to the present invention, which shaped articles are bonded together by a matrix resin to form an integral composite structure. This structure has a density according to ASTM D-3574A of between about 3 and about 30 pounds/ft$^3$ and a compression strength according to ASTM D-3574C of between about 100 and about 1400 pounds/in$^2$. Advantageously the matrix resin employed is a thermosetting resin, such as an epoxy resin, a thermosetting polyimide resin, or a phenolic resin, all of which have afforded syntactic foams having excellent properties. Equally beneficial results are obtained if the matrix resin is a thermoplastic resin. Especially preferred thermoplastic resins are polyimides, polyarylene sulfones, polyarylene ketones, polyarylene ether ketones, polyarylene ether sulfones, polyarylene sulfides, polyphenylene oxides, and polyimides. Syntactic foams according to this aspect of the present invention have excellent high temperature and solvent resistance, flame resistance, high modulus, and excellent chemical and hot water resistance. They have found significant application as structural foam, where substantial stiffness and large weight reduction are required.

EXAMPLES

The following Examples are illustrative of the present invention and are not intended to limit its scope.

I. Preparation of an Aromatic Polyimide Precursor Solid Residuum 1. 756 g (2.4 mol) of ODPA was dispersed in a mixture of 480 g of THF and 280 g of MeOH at room temperature. This solution was treated at 70° C. for 6 hours in order to convert the ODPA into ODPA—DADA complexed with THF by hydrogen bonding. 488 g (2.4 mol) of 3,4'ODA was added to the resulting solution of ODPA—DADA and stirred for 2 hours to yield a homogeneous polyimide precursor solution. The resulting polyimide precursor solution had a solids content of 70 wt % and a viscosity of 20 poise at 20° C. The solution was then charged into a stainless-steel vat and treated at 70° C. for 14 hours in order to evaporate the solvent (THF and MeOH). The resulting material was crushed into a fine powder (2 to 500 $\mu$m). (These powders are sieved using a mesh, if needed.) The polyimide precursor powders were then treated for an additional amount of time (0 to 300 minutes) at 80° C. to further reduce the residual solvents to about 1–10 wt % depending on the final density desired. Residual amounts of THF were determined by measuring proton NMR spectra of the solid residua.

2. The procedure of Example I was repeated except that BTDA and 4,4'ODA were used in replacement of ODPA and 3,4'ODA respectively.

3. The procedure of Example 2 was repeated except that 4,3BAPS was used in replacement of 4,4'ODA.

4. The procedure of Example 1 was repeated except that BPDA and a mixture of 3,4'ODA and APB (85/15 mol ratio) were employed instead of ODPA and 3,4'ODA.

5. 227 g (1.1 mol) of 3,4'ODA was dissolved in a mixture of 1120 g of THF and 280 g of MeOH at room temperature. To the stirring 3,4'ODA solution, 176 g (0.57 mol) of ODPA was added gradually at 15° C. over 40 min. The resulting mixture was stirred for 2 hr at 15° C. to yield a homogeneous solution. To this solution, 197 g (0.57 mol) of ODPA-tetraacid was added gradually and the mixture was stirred for 24 hr at 30° C. to yield a homogeneous precursor solution. Solid content and viscosity of the resulting solution were 30 wt % and 0.2 poise, respectively. From this solution, polyimide precursor powders were prepared in a similar manner to Example 1.

6. 336 g (0.78 mol) of 4,4BAPS was dissolved in a mixture of 1120 g of THF and 280 g of MeOH at room temperature. To the stirring 4,4BAPS solution, 125 g (0.39 mol) of BTDA was added gradually at 15° C. over 40 min. The resulting mixture was stirred for 2 hr at 15° C. to yield a homogeneous solution. To this solution, 139 g (0.39 mol) of BPDA-tetraacid was added gradually and the mixture was stirred for 24 hr at 30° C. to yield a homogeneous precursor solution. Solid content and viscosity of the resulting solution were 30 wt % and 0.2 poise, respectively. From this solution, polyimide precursor powders were prepared in a manner similar to Example 1.

7. The procedure of Example 6 was repeated except that 4,3BAPS was used in replacement of 4,4BAPS.

8. The procedure of Example 6 was repeated except that BAPP was used in replacement of 4,4BAPS.

9. The procedure of Example 6 was repeated except that a mixture of 4,4'DDS and 3.3'DDS (80/20 mol ratio) was used in replacement of 4,4BAPS.

10. The procedure of Example 5 was repeated except that a mixture of 3,4'ODA and APB (85/15 mol ratio) and BPDA were used in replacement of 3,4'ODA and ODPA, respectively.

In Table 1 below, properties of the polyimide precursor solid residuum of the above examples are summarized.

TABLE 1

Properties of Polyimide Precursor Solid Residuum

| Example | PI | Precursor Designation | Ether Contents (wt %) | Average Particle size (μm) | Apparent Density (pcf) |
|---|---|---|---|---|---|
| 1 | ODPA/3,4'ODA | (A) | 2.8 | 200 | 42 |
| 2 | BTDA/4,4'ODA | (B) | 3.9 | 100 | 27 |
| 3 | BTDA/4,3 BAPS | (C) | 4.6 | 150 | 41 |
| 4 | BPDA/3,4'ODA, APB (85/15) | (D) | 4.3 | 140 | 36 |
| 5 | ODPA/3,4'ODA | (E) | 12.0 | 200 | 31 |
| 6 | BTDA/4,4BAPS | (F) | 12.3 | 150 | 22 |
| 7 | BTDA/4,3BAPS | (G) | 11.5 | 150 | 25 |
| 8 | BTDA/BAPP | (H) | 12.1 | 150 | 29 |
| 9 | BTDA/4,4'DDS, 3,3'DDS (80/20) | (I) | 10.5 | 150 | 29 |
| 10 | BPDA/3,4'ODA, APB (85/15) | (J) | 12.0 | 140 | 31 |

II. Preparation of Hollow Polyimide Microspheres

An appropriate amount of a polyimide precursor solid residuum which is designated (A), (B), (C), (D), (E), (F), (G), (H), (I), (J) in Table 1 above was individually charged into a separate open stainless steel container. The containers were place in an oven set at 100° C., and the precursor powders were held at this temperature for approximately 2 hours. Following this, the temperature of the oven was increased to 200° C., and this temperature was maintained for 15 hours. The containers were then returned to ambient conditions, and hollow polyimide microspheres were removed therefrom for testing. Basic properties of these hollow polyimide microspheres arc summarized in Table 2 below.

TABLE 2

Properties of Hollow Polyimide Microspheres

| Precursor Designation | Average Particle size (μm) | Apparent Density (pcf) | Volume change by Pressure Treatment* (%) |
|---|---|---|---|
| (A) | 300 | 3.5 | 5 |
| (B) | 300 | 2.6 | 11 |
| (C) | 200 | 3.0 | 11 |
| (D) | 200 | 3.6 | 9 |
| (E) | 300 | 1.8 | 7 |
| (F) | 300 | 2.5 | 8 |
| (G) | 400 | 2.1 | 18 |
| (H) | 300 | 1.9 | 0 |
| (I) | 400 | 1.6 | 1 |
| (J) | 400 | 2.4 | 16 |

*The pressure treatment is described as follows: Three grams of hollow polyimide microspheres were charged into a closed container, and the volume thereof was measured. Nitrogen gas at a pressure of 30 psi was then applied to the microspheres for 10 minutes at room temperature. Following this, the pressure was released and the volume of the microspheres in the container was measured. The volume change in percent was recorded.

III. Preparation of Syntactic Foams 1. 50 g of the precursor (B) from Table 1 above was blended uniformly with 50 g of 3% offsetting ODPA-3, 4'ODA polyimide powder which is commercially available. The resulting mixture was charged into an open stainless steel container, which was placed in an oven at 170° C., and held up to 120 minutes at this temperature. Once the hold was completed, the container was returned to ambient conditions to obtain lightly sintered flake made of polyimide powder and BTDA-4,4'ODA polyimide microspheres. The apparent density of the resulting flake was 11 pcf.

2. The procedure of Example 1 was repeated except that 200 g of the precursor (B) was used. The apparent density of the resulting flake was 9 pcf.

3. An appropriate amount of the flake obtained by the procedure of examples 1 and 2, respectively, was individually charged into a separate metal mold. The mold was then pressed at 310° C. for 30 min under a pressure of less than 5 kg/cm². Following this, the mold was cooled to room temperature and opened to obtain a molded product. Properties of the resulting syntactic foam are summarized in Table 3 below.

TABLE 3

Properties of Syntactic Foams

| | | Syntactic Foam Produced | |
|---|---|---|---|
| Precursor Designation | Flake Density (pcf) | Density (pcf) | Compression Strength (psi) |
| (B) | 11 | 20 | 562 |
| (B) | 9 | 20 | 623 |

As seen from Table 3, syntactic foams having a density of less than 30 pound/ft³ are provided according to the present invention of a dry unconsolidated composition via dry process, in contrast to the processes of the art which include the conventional wet process and the dry unconsolidated composition via wet process.

We claim:

1. A syntactic foam comprising a multiplicity of shaped articles, in the form of hollow aromatic polyimide microspheres having a particle size of from about 100 to about 1500 μm, which are bonded together by a matrix resin to form an integral composite structure having a density according to ASTM D-3574A of from about 3 to about 30 pounds/ft³ and a compression strength according to ASTM D-3574C of from about 100 to about 1400 pounds/in².

2. A syntactic foam according to claim 1, wherein the matrix resin is a thermosetting resin.

3. A syntactic foam according to claim 2, wherein the thermosetting resin is a member selected from the group consisting of epoxy resin, thermosetting polyimide resin and phenolic resin.

4. A syntactic foam according to claim 1, wherein the matrix resin is a thermoplastic resin.

5. A syntactic foam according to claim 4, wherein the thermoplastic resin is a member selected from the group consisting of polyimide, polyarylene sulfone, polyarylene ketone, polyanlene ether ketone, polyarylene ether sulfone, polyarylene sulfide, polyphenylene oxide, and polyimide.

* * * * *